US012779638B2

(12) United States Patent
Chiang

(10) Patent No.: US 12,779,638 B2
(45) Date of Patent: Nov. 3, 2026

(54) INSULATED TORQUE WRENCH

(71) Applicant: William Tools Co., Ltd., Taichung City (TW)

(72) Inventor: Shui-Lai Chiang, Taichung City (TW)

(73) Assignee: WILLIAM TOOLS CO., LTD., Taichung City (TW)

( * ) Notice: Subject to any disclaimer, the term of this patent is extended or adjusted under 35 U.S.C. 154(b) by 466 days.

(21) Appl. No.: 18/542,237

(22) Filed: Dec. 15, 2023

(65) Prior Publication Data

US 2024/0198504 A1 Jun. 20, 2024

(30) Foreign Application Priority Data

Dec. 16, 2022 (TW) ................................ 111148488

(51) Int. Cl.
*B25B 23/142* (2006.01)
*B25G 1/12* (2006.01)

(52) U.S. Cl.
CPC .......... *B25B 23/1427* (2013.01); *B25G 1/125* (2013.01)

(58) Field of Classification Search
CPC .............. B25B 23/1427; B25B 23/142; B25B 23/1425; B25B 23/14; B25B 23/1405; B25B 23/141; B25B 23/1415; B25B 23/1422; B25B 23/147; B25B 23/1475; B25B 23/15; B25G 1/125; B25G 1/12
USPC .................................................... 81/478, 479
See application file for complete search history.

(56) References Cited

U.S. PATENT DOCUMENTS

| | | | | |
|---|---|---|---|---|
| 2,448,095 A * | 8/1948 | Hallett | B25B 23/1427 81/477 |
| 2,887,921 A * | 5/1959 | Livermont | B25B 23/1427 73/862.23 |
| 3,165,014 A * | 1/1965 | Grabovac | B25B 23/1427 81/483 |
| 2011/0113936 A1* | 5/2011 | Chiang | B25B 23/1427 81/483 |
| 2013/0213195 A1* | 8/2013 | Czympiel | B25B 23/1427 81/467 |

(Continued)

FOREIGN PATENT DOCUMENTS

| | | | |
|---|---|---|---|
| TW | M543149 U * | 6/2017 | |
| TW | 1645944 B * | 1/2019 | B25B 23/1427 |
| TW | M616790 U | 9/2021 | |

*Primary Examiner* — Monica S Carter
*Assistant Examiner* — Kent N Shum
(74) *Attorney, Agent, or Firm* — MUNCY, GEISSLER, OLDS & LOWE, P.C.

(57) ABSTRACT

An insulated torque wrench includes: a main body; a torque adjustment member; a sleeve; an adjustment assembly including a switching member, a driving member, a first limitation member and a second limitation member, the switching member being rotatably disposed on the main body, the switching member being axially movable relatively to the main body between a first position and a second position, the switching member including a second blocking portion, the switching member being movable relatively to the driving member and the first limitation member, the switching member and the driving member co-rotatably connected with each other, the driving member and the torque adjustment member being rotatable with each other, in the axial direction the switching member being blocked by the first limitation member; an insulation layer; and a torque display assembly.

10 Claims, 12 Drawing Sheets

(56) References Cited

U.S. PATENT DOCUMENTS

| | | | | |
|---|---|---|---|---|
| 2018/0050442 | A1* | 2/2018 | Ballsieper | B25G 3/12 |
| 2019/0084135 | A1* | 3/2019 | Guo | B25B 23/16 |

* cited by examiner

INSULATED TORQUE WRENCH

BACKGROUND OF THE INVENTION

Field of the Invention

The present invention relates to an insulated torque wrench.

Description of the Prior Art

A torque wrench capable of adjusting torque setting value is usually used in fastening or unfastening fasteners, which can avoid problems such as damage to the object or the fastener due to over-tightening.

In the conventional torque wrench, such as that disclosed in TW M616790, the adjustment mechanism for adjusting torque is located at an end of the handle, and the size of the adjustment mechanism is small, so that it can only be rotated by applying force with fingers during adjustment.

Besides, since most torque wrenches are made of metal, it is easy to conduct electricity to the operator, causing danger and injury to the operator.

The present invention is, therefore, arisen to obviate or at least mitigate the above-mentioned disadvantages.

SUMMARY OF THE INVENTION

The main object of the present invention is to provide an insulated torque wrench with which the user can directly hold an insulated grip to adjust the torque and which can provide the function of preventing leakage and withstanding high voltage.

To achieve the above and other objects, an insulated torque wrench is provided, wherein the insulated torque wrench includes: a main body defining an axial direction and including a work portion, the work portion generating a warning sound when receiving a torque larger than a preset torque value; a torque adjustment member being rotatably disposed in the main body, the preset torque value being adjustable by rotating the torque adjustment member; a sleeve non-rotatably disposed around the main body and including a first engaging portion and a see-through portion; an adjustment assembly including a switching member, a driving member, a first limitation member and a second limitation member, the switching member being rotatably disposed on the main body, the switching member being movable between a first position and a second position in the axial direction relative to the main body, the switching member including a second engaging portion, the switching member being movable in the axial direction relative to the driving member and the first limitation member, the switching member and the driving member being rotatable with each other, the driving member and the torque adjustment member being rotatable with each other, the driving member and the first limitation member being connected to each other in the axial direction, in the axial direction the switching member being blocked by the first limitation member, the second limitation member being connected between the first limitation member and the driving member; an insulation layer including an insulated grip and an insulated sleeve, the insulated sleeve being disposed around the main body, the work head being protrusive out beyond the insulated sleeve, the insulated grip being disposed around the switching member, the insulated grip and the switching member being rotatable with each other; and a torque display assembly including a torque scale displaying barrel and a cover, the torque scale displaying barrel being disposed in the sleeve and rotatable with the torque adjustment member, the torque scale displaying barrel including a plurality of torque scale displaying portions, the plurality of torque scale displaying portions being configured to display torque values in different units respectively, the plurality of torque scale displaying portions being arranged in the axial direction, the plurality of torque scale displaying portions corresponding to the see-through portion, the cover being movably disposed on the sleeve, the cover being movable relative to the sleeve to be in one of a plurality of shielding positions so that the cover shields at least one of the plurality of torque scale displaying portions and so that the rest of the plurality of torque scale displaying portions are revealed; wherein when the switching member is in the first position, the second engaging portion is engaged with the first engaging portion so that the sleeve and the switching member are rotatable with each other; when the switching member is in the second position, the second engaging portion is disengaged from the first engaging portion.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
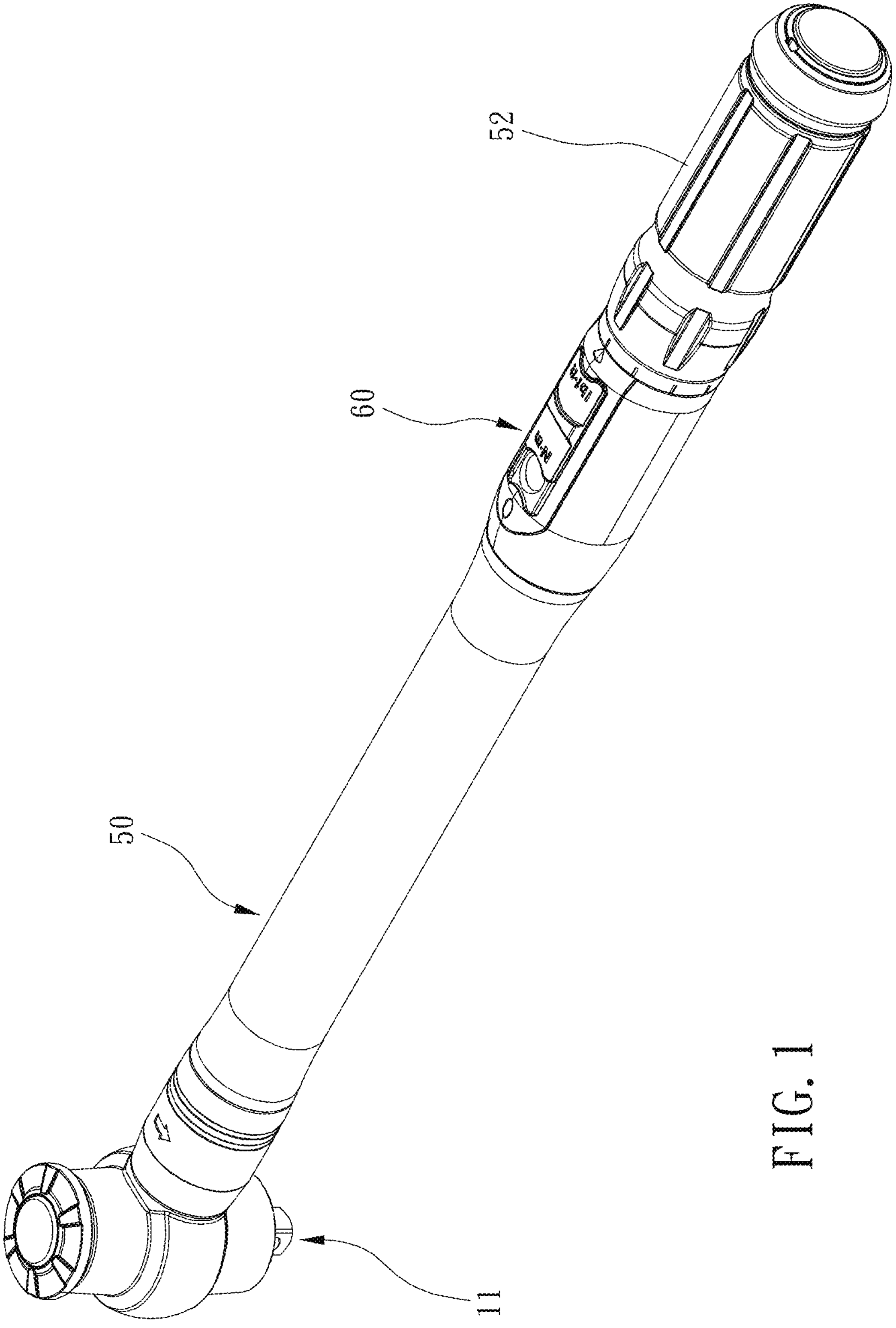
FIG. 1 is a stereogram of an exemplary embodiment of the present invention.
Figure 2:
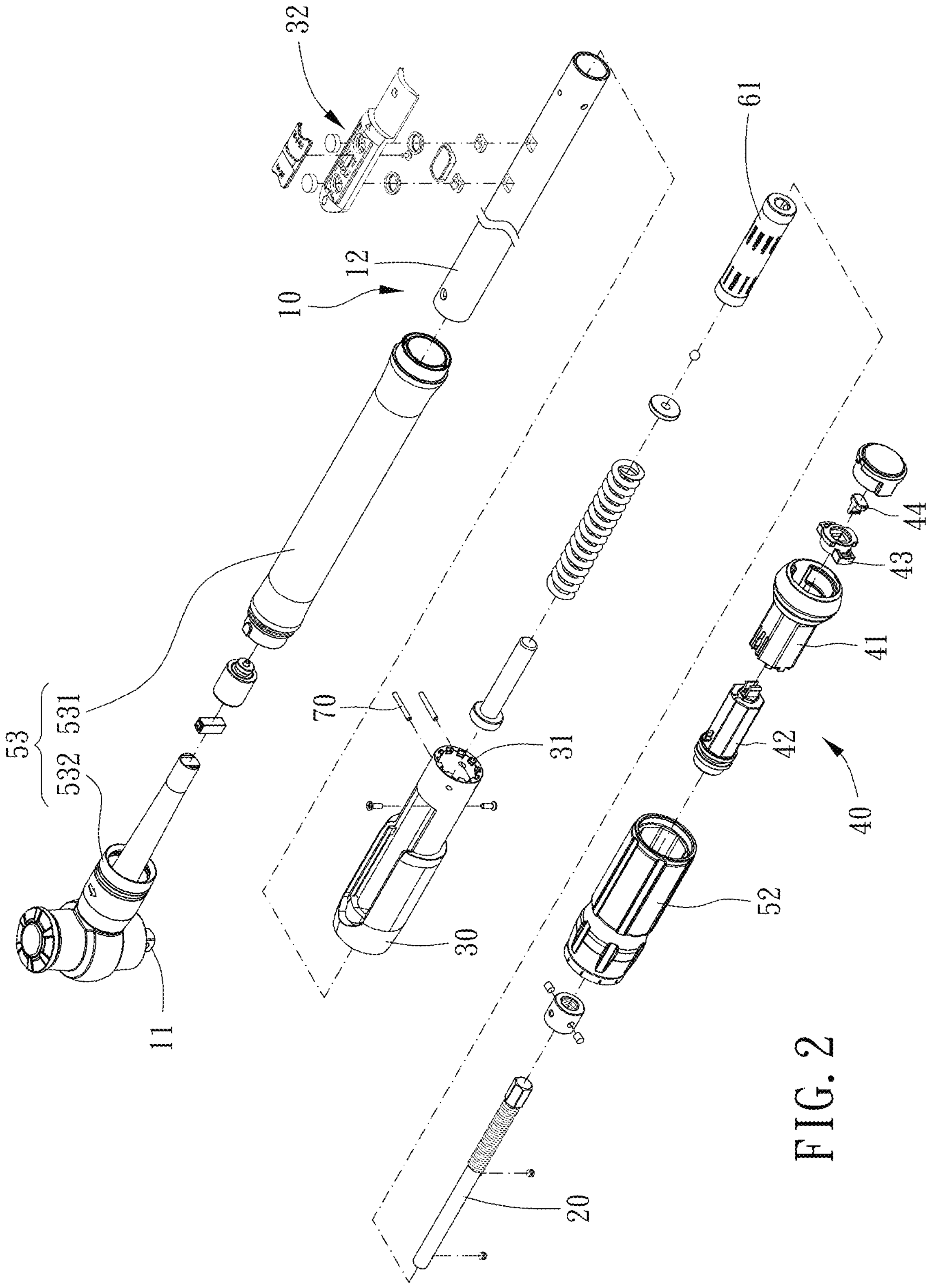
FIG. 2 is a breakdown drawing of an exemplary embodiment of the present invention.
Figure 3:
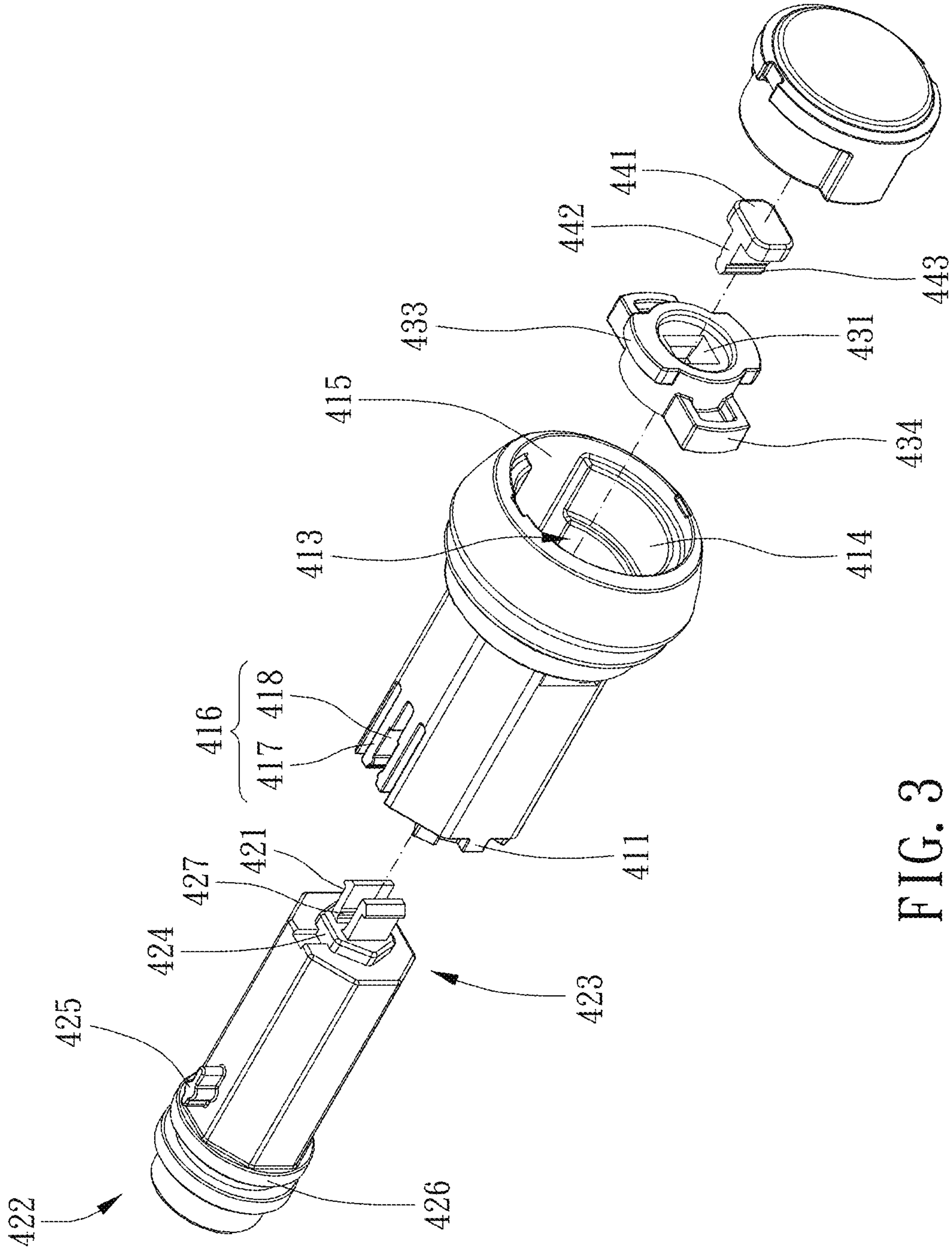
FIG. 3 is a breakdown drawing of an adjustment assembly of an exemplary embodiment of the present invention.
Figure 4:
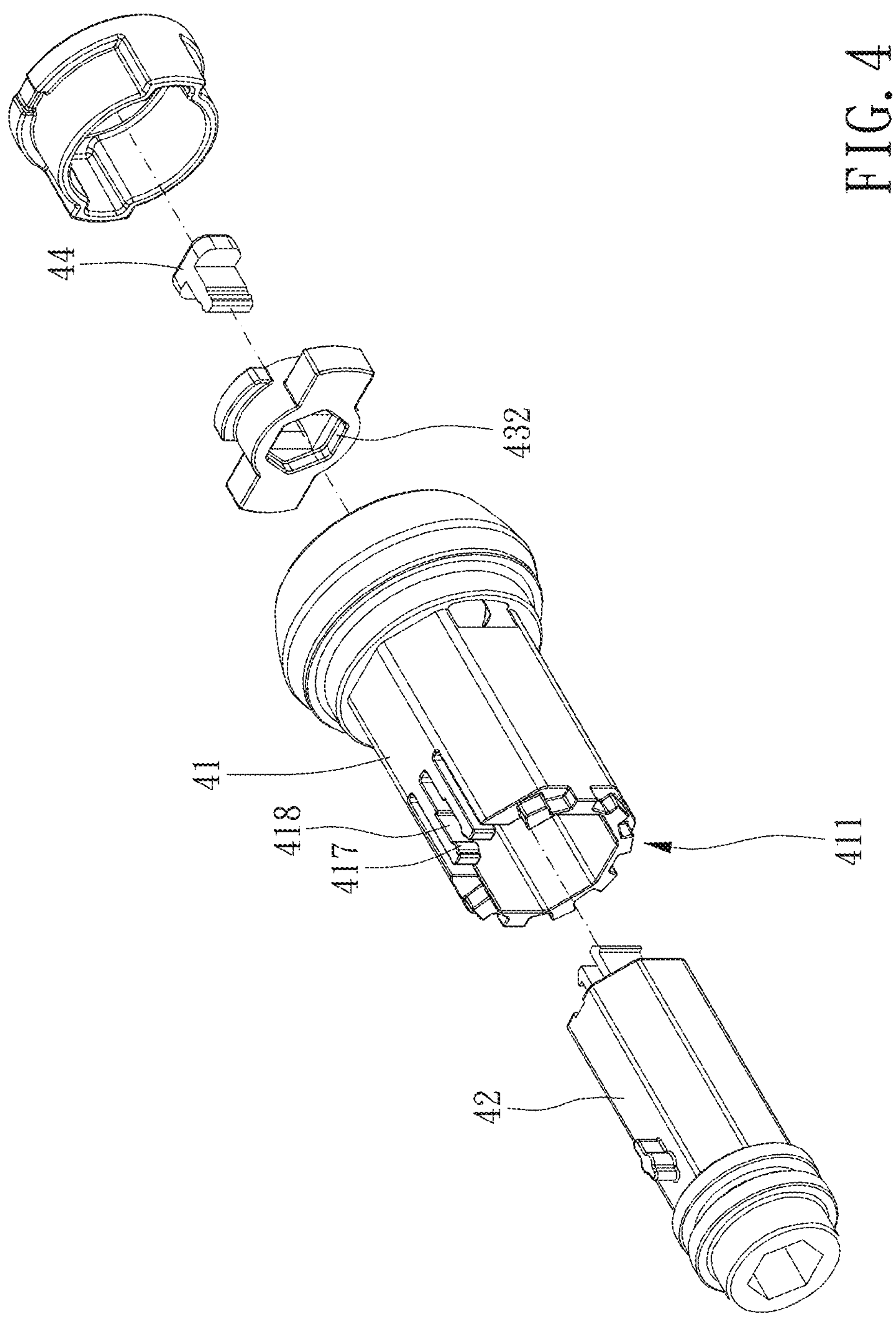
FIG. 4 is another breakdown drawing of the adjustment assembly of an exemplary embodiment of the present invention.
Figure 5:
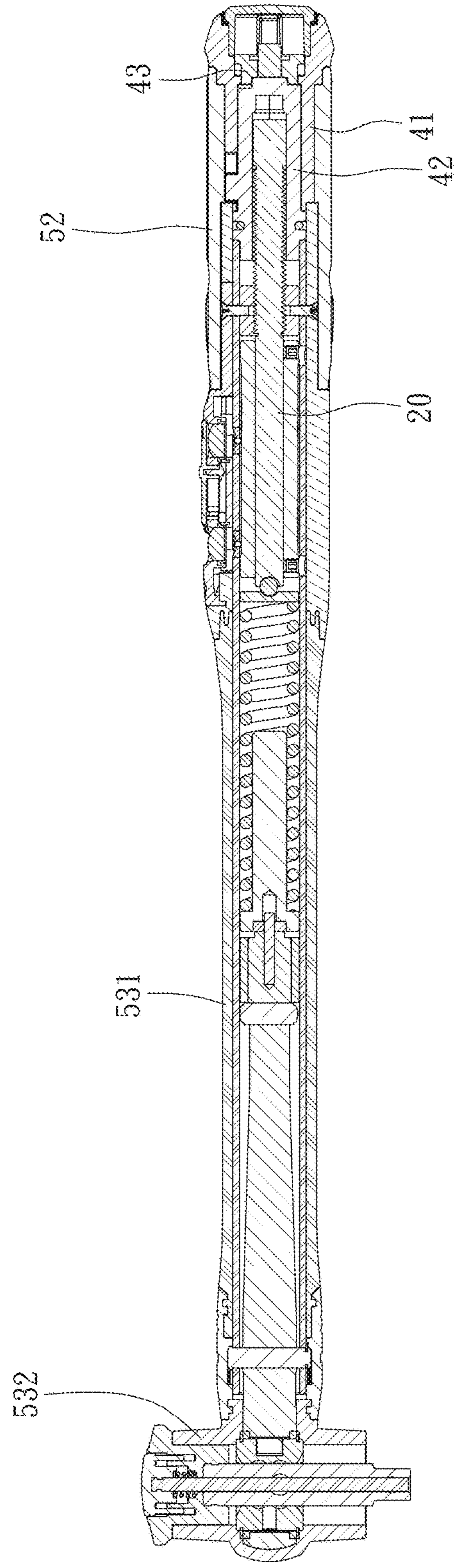
FIG. 5 is a cross-sectional view of an exemplary embodiment of the present invention.
Figure 6:
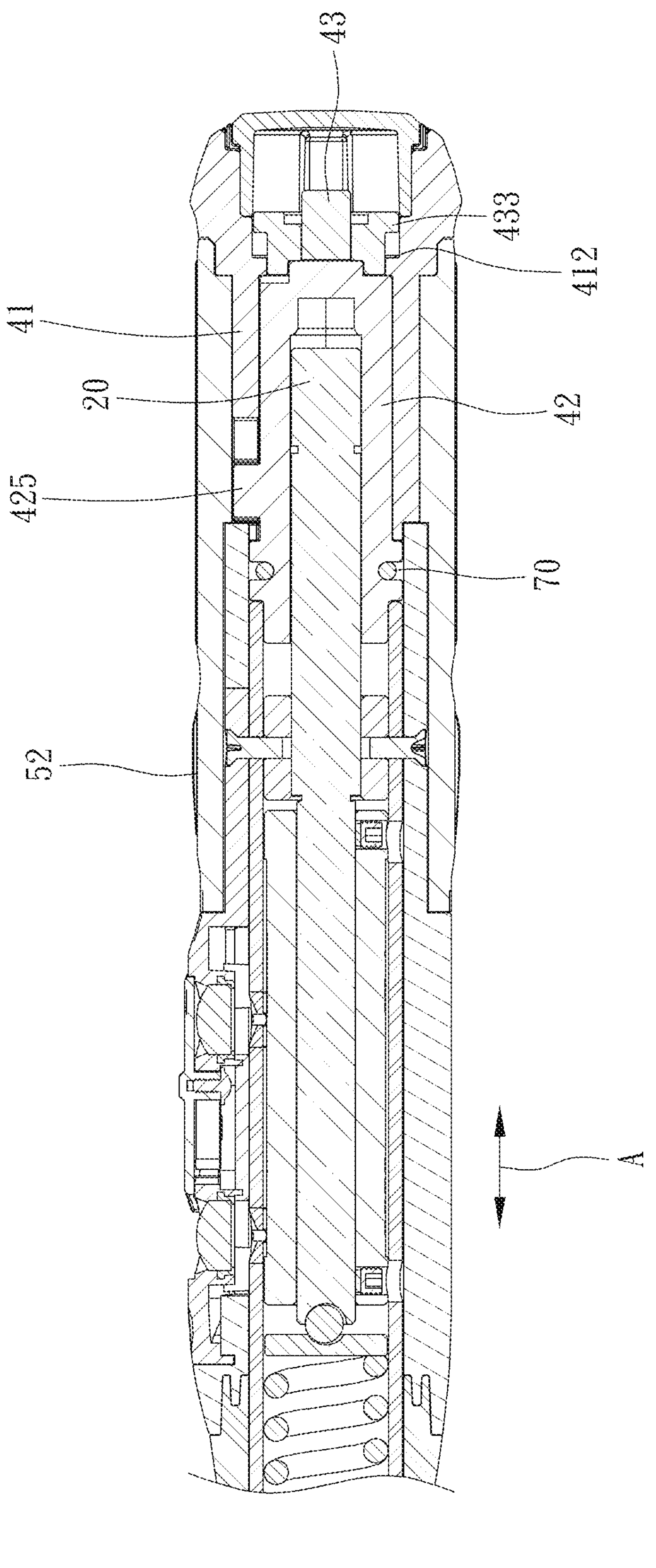
FIG. 6 is a cross-sectional view of a switching member in a first position according to an exemplary embodiment of the present invention.
Figure 7:
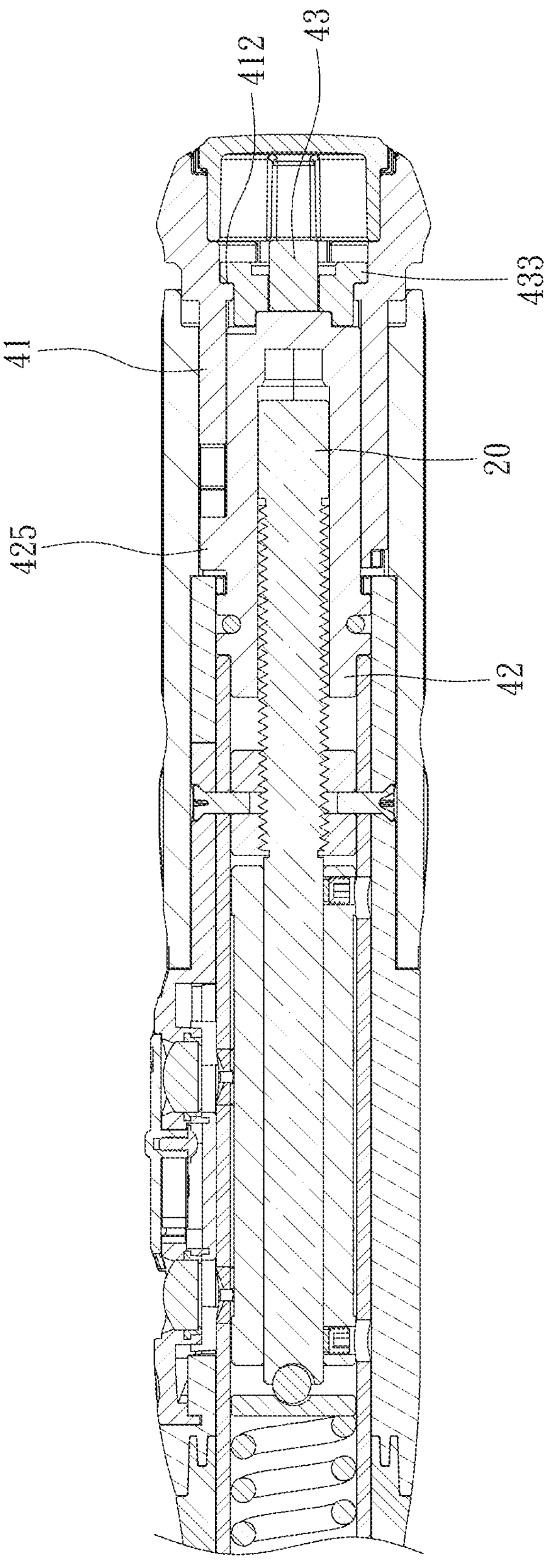
FIG. 7 is a cross-sectional view of the switching member in a second position according to an exemplary embodiment of the present invention.
Figure 8:
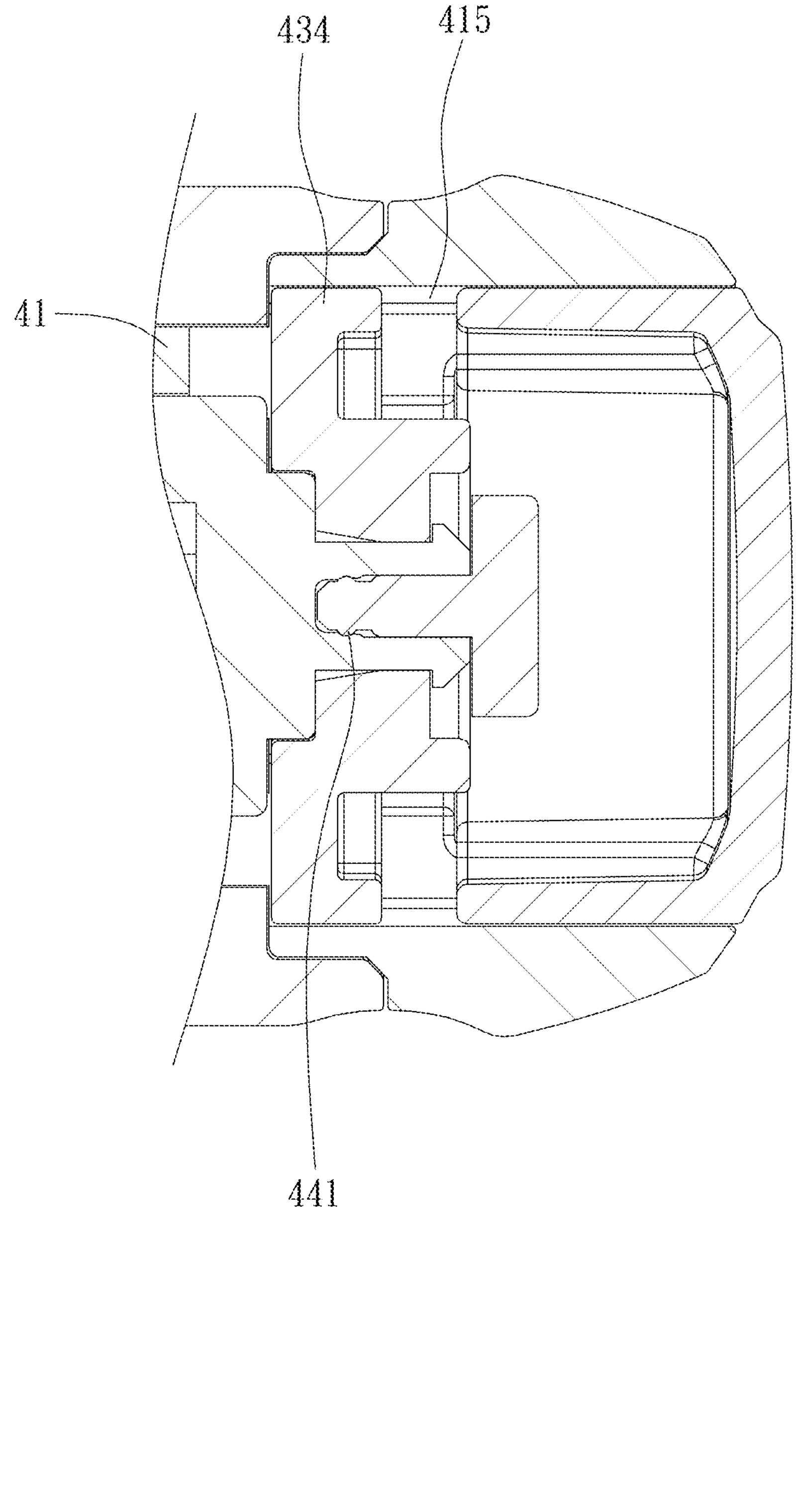
FIG. 8 is a partial cross-sectional view of an exemplary embodiment of the present invention.
Figure 9:
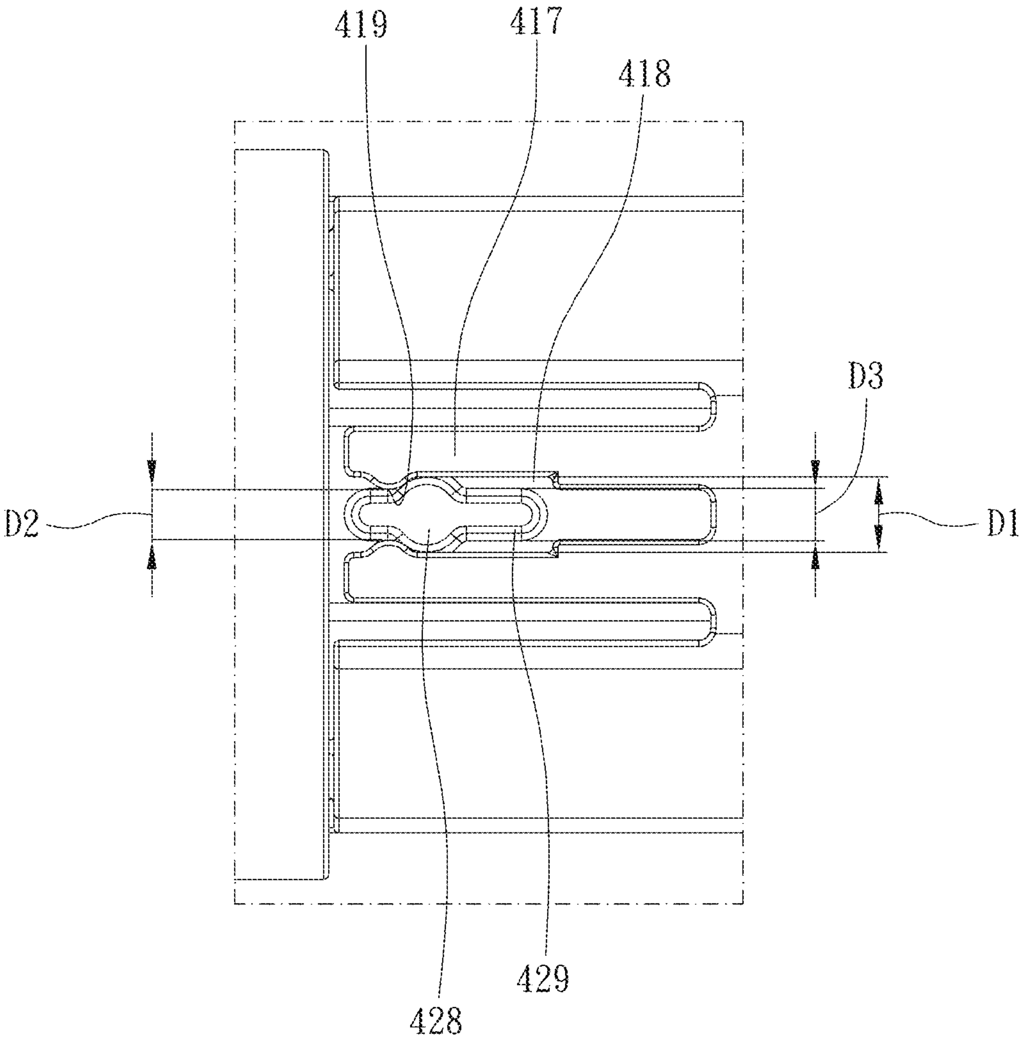
FIG. 9 is a partial top view of an exemplary embodiment of the present invention.
Figure 10:
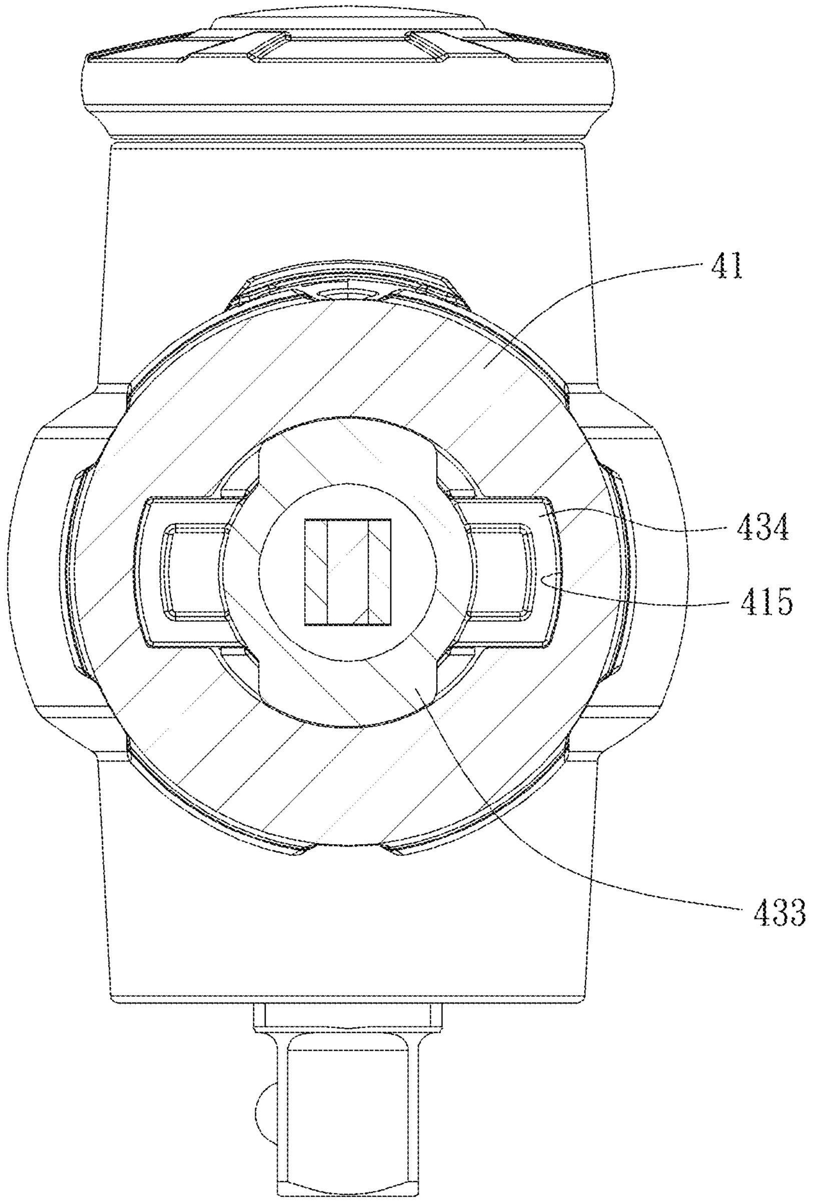
FIG. 10 is another cross-sectional view of an exemplary embodiment of the present invention.
Figure 11:
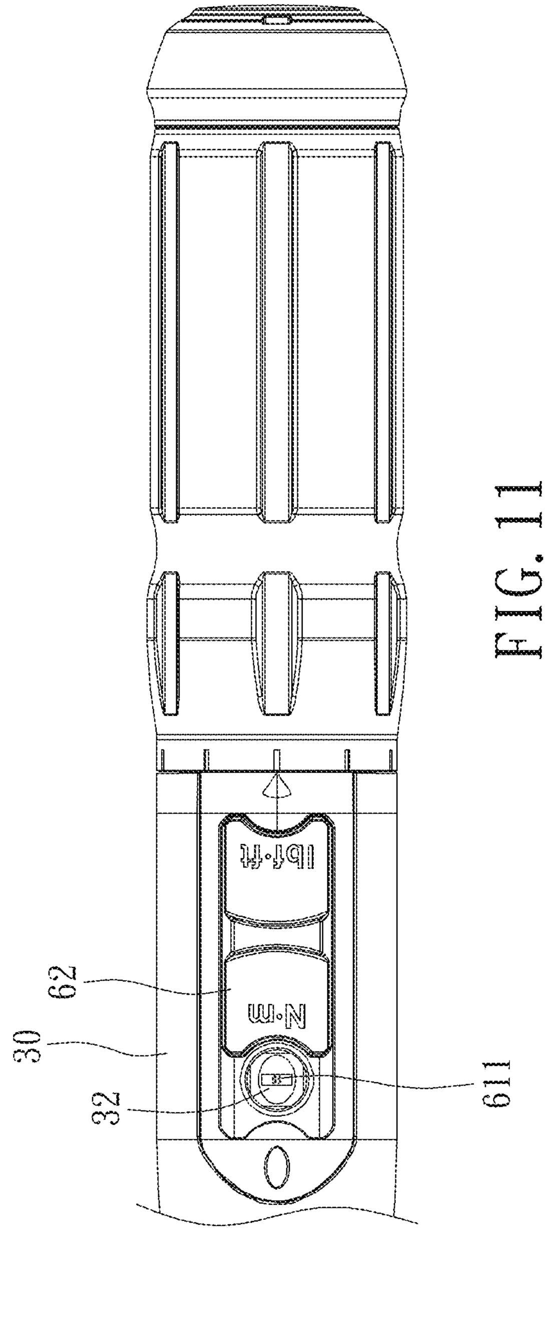
FIG. 11 is a drawing showing a switching member in a shielding position according to an exemplary embodiment of the present invention.
Figure 12:
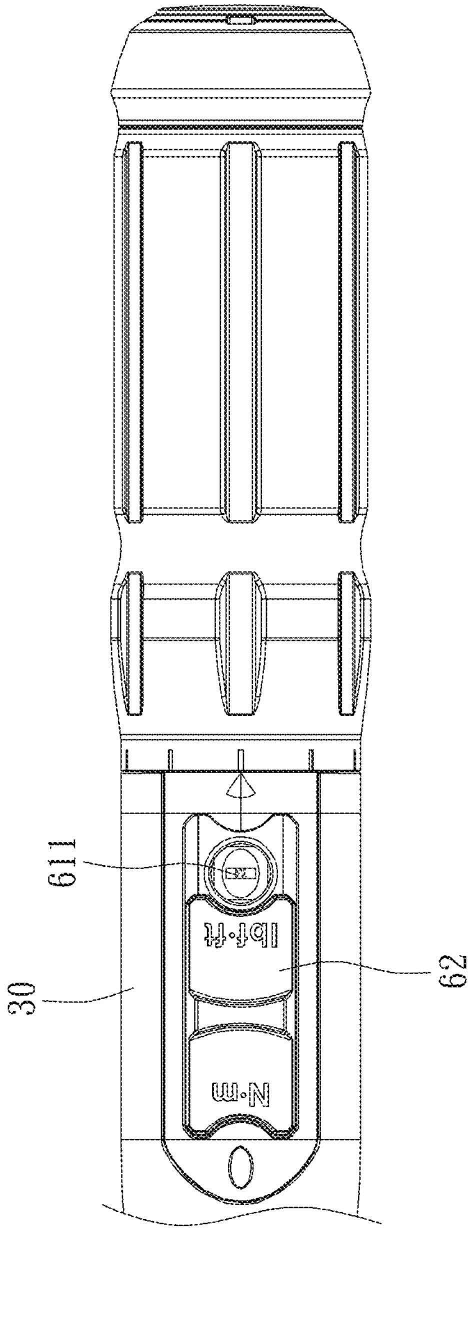
FIG. 12 is a drawing showing the switching member in another shielding position according to an exemplary embodiment of the present invention.
Figure 13:
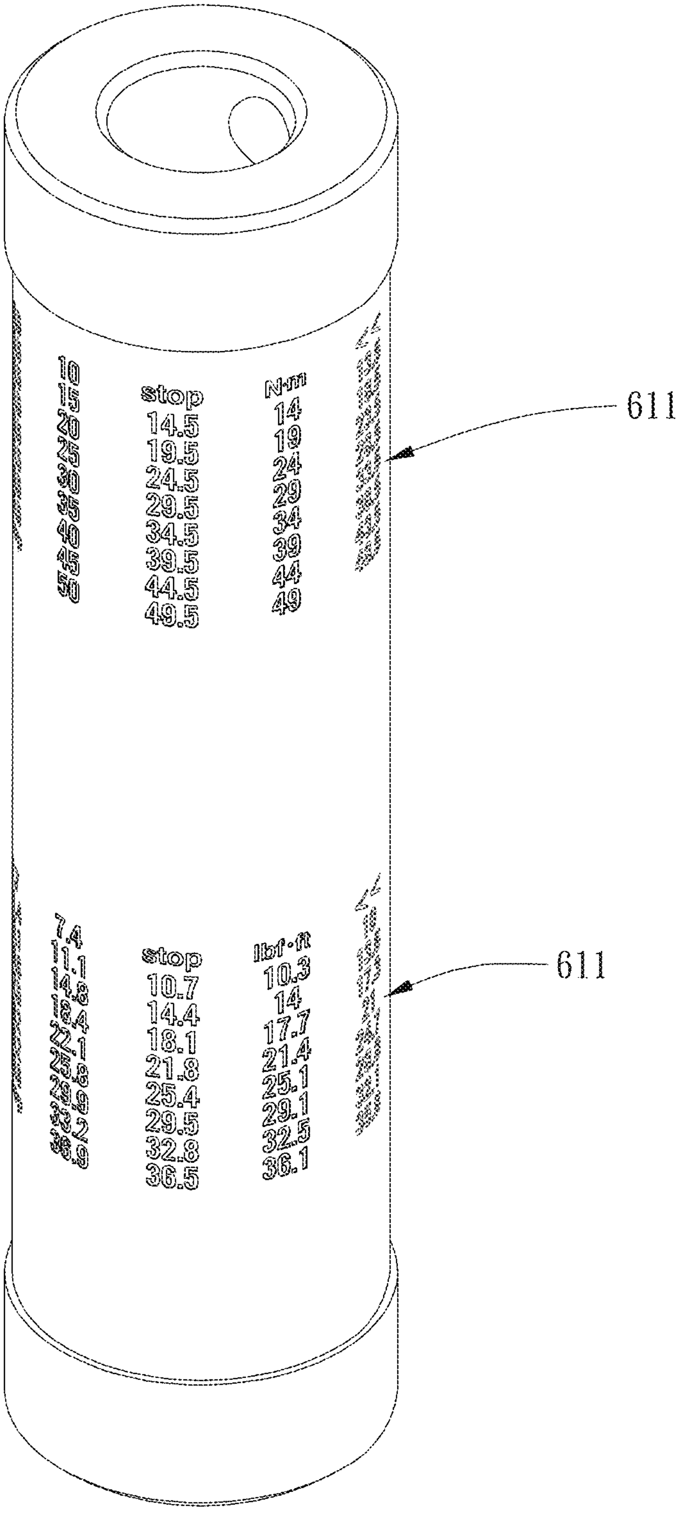
FIG. 13 is a stereogram of a torque scale displaying barrel of an exemplary embodiment of the present invention.

Please refer to FIGS. 1 to 13 for an exemplary embodiment of the present invention. An insulated torque wrench of the present invention includes a main body 10, a torque adjustment member 20, a sleeve 30, an adjustment assembly 40, an insulation layer 50 and a torque display assembly 60.

The main body 10 defines an axial direction A and includes a work head 11, and the work head 11 generates a warning sound when receiving a torque larger than a preset torque value. The torque adjustment member 20 is rotatably disposed in the main body 10, and the preset torque value being adjustable by rotating the torque adjustment member 20. The sleeve 30 is non-rotatably disposed around the main body 10 and includes a first engaging portion 31 and a see-through portion 32. The adjustment assembly 40 includes a switching member 41, a driving member 42, a first limitation member 43 and a second limitation member 44, the switching member 41 is rotatably disposed on the main body 10, the switching member 41 is movable between a first position and a second position in the axial direction A relative to the main body 10, the switching member 41 includes a second engaging portion 411, the switching member 41 is movable in the axial direction A relative to the driving member 42 and the first limitation member 43, the switching member 41 and the driving member 42 are rotatable with each other, the driving member 42 and the torque adjustment member 20 are rotatable with each other, the driving member 42 and the first limitation member 43 are connected to each other in the axial direction A, in the axial direction A the switching member 41 is blocked by the first limitation member 43, and the second limitation member 44 is connected between the first limitation member 43 and the driving member 42. The insulation layer 50 includes an insulated grip 52 and an insulated sleeve 53, the insulated sleeve 53 is disposed around the main body 10, the work head 11 is protrusive out beyond the insulated sleeve 53, the insulated grip 52 is disposed around the switching member 41, and the insulated grip 52 and the switching member 41 are rotatable with each other. In this embodiment, the switching member 41 is movable in the axial direction A relative to the insulated grip 52. The torque display assembly 60 includes a torque scale displaying barrel 61 and a cover 62, the torque scale displaying barrel 61 is disposed in the sleeve 30 and rotatable with the torque adjustment member 20, the torque scale displaying barrel 61 includes a plurality of torque scale displaying portions 611, and the plurality of torque scale displaying portions 611 are configured to display torque values in different units, respectively. The plurality of torque scale displaying portions 611 are arranged in the axial direction A, the plurality of torque scale displaying portions 611 correspond to the see-through portion 32, the cover 62 is movably disposed on the sleeve 30, and the cover 62 is movable relative to the sleeve 30 to be in one of a plurality of shielding positions so that the cover 62 shields at least one of the plurality of torque scale displaying portions 611 and so that the rest of the torque scale displaying portion 611 are revealed. When the switching member 41 is in the first position, the second engaging portion 411 is engaged with the first engaging portion 31 so that the sleeve 30 and the switching member 41 are rotatable with each other. When the switching member 41 is in the second position, the second engaging portion 411 is disengaged from the first engaging portion 31. As such, the switching member 41 is rotated to adjust the torque value when the insulated grip 52 is rotated. The user can operate the insulated torque wrench by holding the insulated grip 52, and can directly hold the insulated grip 52 to adjust the torque, which is easy to apply force and adjust the torque value. Furthermore, it can provide the function of preventing leakage and withstanding high voltage. The unit of torque value can be selected, and the torque value of the selected torque unit can be directly and quickly identified when adjusting the torque.

The switching member 41 and the driving member 42 may be rotatable with each other by connection of polygonal post and hole, the driving member 42 and the torque adjustment member 20 may be rotatable with each other by connection of polygonal post and hole, and the insulated grip 52 and the switching member 41 may be rotatable with each other by connection of polygonal post and hole.

One of the driving member 42 and the first limitation member 43 includes an engaging hole 431, and the other of the driving member 42 and the first limitation member 43 includes at least one buckling member 421. The at least one buckling member 421 is engaged in the engaging hole 431 in the axial direction A, and the second limitation member 44 is inserted in the engaging hole 431 and located on a swinging path of the buckling member 421. Preferably, the driving member 42 includes two the buckling members 421, the two buckling members 421 extend in the axial direction A, the two buckling members 421 are swingable relative to each other, the first limitation member 43 includes the engaging hole 431, the engaging hole 431 extends through the first limitation member 43 in the axial direction A, the two buckling members 421 are inserted in the engaging hole 431 and buckled with the first limitation member 43, the second limitation member 44 includes a restriction portion 441 and an insertion portion 442, the restriction portion 441 is transversely connected to the insertion portion 442, the insertion portion 442 is inserted in the engaging hole 431 in the axial direction A and inserted between the two buckling members 421, and in the axial direction A the restriction portion 441 is blocked by a side of the first limitation member 43 opposite to the driving member 42. The at least one buckling member 421 includes an interspace 427, the insertion portion 442 includes a protrusion 443, and the protrusion 443 is releasably engaged in the interspace 427. The driving member 42, the first limitation member 43 and the second limitation member 44 are combined with each other without using any screws and pins, which provides high bonding strength and facilitate quick disassembly and assembly. Specifically, the two buckling members 421 are swingable to be engaged in or disengaged from the engaging hole 431, the second limitation member 44 urges the two buckling members 421 to relatively expand to be restricted in the engaging hole 431.

The driving member 42 includes a first end portion 422 and a second end portion 423 in the axial direction A, the first end portion 422 is connected to the torque adjustment member 20, one of the second end portion 423 and the first limitation member 43 includes a polygonal hole 432, the other of the second end portion 423 and the first limitation member 43 includes a polygonal projection 424, and the polygonal projection 424 is received in the polygonal hole 432 in the axial direction A. In this embodiment, the second end portion 423 includes the polygonal projection 424, and the first limitation member 43 includes the polygonal hole 432. The plurality of buckling members 421 project from the polygonal projection 424 so that the driving member 42 can drive the first limitation member 43 to rotate.

The switching member 41 includes at least one first blocking portion 412 extending radially, the first limitation member 43 includes a second blocking portion 433 extending radially, the first blocking portion 412 and the second blocking portion 433 are blocked with each other in the axial direction A. Preferably, the first limitation member 43 further includes at least one guiding block 434 extending radially, the switching member 41 further includes a sleeving hole 413 and a surrounding wall 414, the driving member 42 is inserted in the sleeving hole 413, the surrounding wall 414 defines the sleeving hole 413, the surrounding wall 414 includes at least one groove 415, the at least one groove 415 extends in the axial direction A and is in communication with the sleeving hole 413, and the at least one guiding block 434 is received in the at least one groove 415 and slidable in the axial direction A so that the first limitation member 43 can move smoothly when the switching member 41 and the first limitation member 43 move relatively. In the axial direction A the plurality of guiding blocks 434 block the switching member 41, and the switching member 41 can drive the first limitation member 43 to rotate.

The driving member 42 includes a first lock portion 425, the switching member 41 further includes a second lock portion 416, the second lock portion 416 and the first lock portion 425 are releasably locked with each other, and the second lock portion 416 is blocked with the first lock portion 425 in the axial direction A. In this embodiment, the first lock portion 425 is a bump, the first lock portion 425 has a largest outer diametric dimension D1, the second lock portion 416 includes a plurality of elastic arms 417, an engaging slot 418 and an insertion opening 419, the plurality of elastic arms 417 are swingable relative to one another, the plurality of elastic arms 417 define the engaging slot 418 and the insertion opening 419, the insertion opening 419 is in communication with the engaging slot 418 and has a caliber dimension D2, and the insertion opening 419 allows the first lock portion 425 to pass therethrough in the axial direction A. The caliber dimension D2 is smaller than the largest outer diametric dimension D1. The first lock portion 425 includes a large diameter section 428 and two small diameter sections 429, the two small diameter sections 429 are connected to opposing sides of the large diameter section 428, and each of the two small diameter sections 429 has an outer diametric dimension D3 smaller than or equal to the caliber dimension D2. When the switching member 41 is in the first position and is locked, the switching member 41 is non-movable relative to the main body 10 in the axial direction A. When the first lock portion 425 applies a force larger than the retaining force of the plurality of elastic arms to the plurality of elastic arms 417, the plurality of elastic arms are deformed so that the first lock portion 425 can be engaged in or disengaged from the engaging slot 418. As such, by simply moving the switching member 41 in the axial direction A, it may be chosen to lock or unlock the switching member 41 in the first position so that it can move freely relative to the main body 10, providing quick switching.

The insulated torque wrench further includes at least one pin 70, the driving member 42 includes an annular recess 426, and the at least one pin 70 is disposed radially through the housing 30 and engaged within the annular recess 426. The driving member 42 is blocked by the at least one pin 70 in the axial direction A. As such, the driving member 42 is axially non-movable relative to the main body 10, and the at least one pin 70 is kept in the annular recess 426 during rotation.

The main body 10 further includes a tubular member 12, the sleeve 30 is disposed around the tubular member 12, the torque scale displaying barrel 61 is disposed in the tubular member 12, the sleeve 30 and the tubular member 12 form the see-through portion 32, and the see-through portion 32 corresponds to the plurality of torque scale displaying portions 611.

The insulated sleeve 53 includes a body sleeve 531 and a head sleeve 532, the head sleeve 532 is disposed around the work head 11, the body sleeve 531 is disposed around the tubular member 12, and the work head 11 is made of metal.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An insulated torque wrench including:

a main body defining an axial direction and including a work portion, the work portion generating a warning sound when receiving a torque larger than a preset torque value;

a torque adjustment member being rotatably disposed in the main body, the preset torque value being adjustable by rotating the torque adjustment member;

a sleeve non-rotatably disposed around the main body and including a first engaging portion and a see-through portion;

an adjustment assembly including a switching member, a driving member, a first limitation member and a second limitation member, the switching member being rotatably disposed on the main body, the switching member being movable between a first position and a second position in the axial direction relative to the main body, the switching member including a second engaging portion, the switching member being movable in the axial direction relative to the driving member and the first limitation member, the switching member and the driving member being rotatable with each other, the driving member and the torque adjustment member being rotatable with each other, the driving member and the first limitation member being connected to each other in the axial direction, in the axial direction the switching member being blocked by the first limitation member, the second limitation member being connected between the first limitation member and the driving member;

an insulation layer including an insulated grip and an insulated sleeve, the insulated sleeve being disposed around the main body, the work head being protrusive out beyond the insulated sleeve, the insulated grip being disposed around the switching member, the insulated grip and the switching member being rotatable with each other; and a torque display assembly including a torque scale displaying barrel and a cover, the torque scale displaying barrel being disposed in the sleeve and rotatable with the torque adjustment member, the torque scale displaying barrel including a plurality of torque scale displaying portions, the plurality of torque scale displaying portions being configured to display torque values of different unit sets respectively, the plurality of torque scale displaying portions being arranged in the axial direction, the plurality of torque scale displaying portions corresponding to the see-through portion, the cover being movably disposed on the sleeve, the cover being movable relative to the sleeve to be in one of a plurality of shielding positions so that only one of the torque values of one of the different unit sets is revealed and the rest of the torque values of the different unit sets are shielded by the cover;

wherein when the switching member is in the first position, the second engaging portion is engaged with the first engaging portion so that the sleeve and the switching member are rotatable with each other; and when the switching member is in the second position, the second engaging portion is disengaged from the first engaging portion.

2. The insulated torque wrench of claim 1, wherein one of the driving member and the first limitation member includes an engaging hole, the other of the driving member and the first limitation member includes at least one buckling member, the at least one buckling member is engaged in the engaging hole in the axial direction, and the second limitation member is inserted in the engaging hole and located on a swinging path of the at least one buckling member.

3. The insulated torque wrench of claim 2, wherein the at least one buckling member includes two buckling members, the two buckling members extending in the axial direction, the two buckling members are swingable relative to each other, the first limitation member includes the engaging hole, the engaging hole extends through the first limitation member in the axial direction, the two buckling members are inserted in the engaging hole and buckled with the first limitation member, the second limitation member includes a restriction portion and an insertion portion, the restriction portion is transversely connected to the insertion portion, the insertion portion is inserted in the engaging hole in the axial direction and inserted between the two buckling members, and in the axial direction the restriction portion is blocked by a side of the first limitation member opposite to the driving member.

4. The insulated torque wrench of claim 3, wherein the main body further includes a tubular member with at least one opening, the sleeve is disposed around the tubular member, the torque scale displaying barrel is disposed in the tubular member, the sleeve and the at least one opening in the tubular member align at the see-through portion, and the see-through portion corresponds to the plurality of torque scale displaying portions; the insulated sleeve includes a body sleeve and a head sleeve, the head sleeve is disposed around the work head, and the body sleeve is disposed around the tubular member; the at least one buckling member includes an interspace, the insertion portion includes a protrusion, and the protrusion is releasably engaged in the interspace; the driving member includes a first end portion and a second end portion in the axial direction, the first end portion is connected to the torque adjustment member, the second end portion includes a polygonal projection, the first limitation member includes a polygonal hole, and the polygonal projection is received in the polygonal hole in the axial direction; the at least one buckling member projects from the polygonal projection; the switching member further includes at least one first blocking portion extending radially, the first limitation member includes a second blocking portion extending radially, and the first blocking portion and the second blocking portion are blocked with each other in the axial direction; the first limitation member further includes a plurality of guiding blocks, each of the plurality of guiding blocks extend radially, the switching member further includes a sleeving hole and a surrounding wall, the driving member is inserted in the sleeving hole, the surrounding wall defines the sleeving hole, the surrounding wall includes at least one groove, the at least one groove extends in the axial direction and is in communication with the sleeving hole, and at least one guiding block from the plurality of guiding blocks is received in the at least one groove and slidable in the axial direction; in the axial direction the at least one guiding block blocks the switching member; the driving member includes a first lock portion, the switching member further includes a second lock portion, the first lock portion and the second lock portion are releasably locked with each other, and the second lock portion is blocked with the first lock portion in the axial direction; the first lock portion is a bump, the first lock portion has a largest outer diametric dimension, the second lock portion includes a plurality of elastic arms, an engaging slot and an insertion opening, the plurality of elastic arms are swingable relative to one another, the plurality of elastic arms define the engaging slot and the insertion opening, the insertion opening is in communication with the engaging slot and has a caliber dimension, and the insertion opening allows the first lock portion to pass therethrough in the axial direction; the caliber dimension is smaller than the largest outer diametric dimension; the first lock portion includes a large diameter section and two small diameter sections, the two small diameter sections are connected to opposing sides of the large diameter section, and each of the two small diameter sections has an outer diametric dimension smaller than or equal to the caliber dimension; the insulated torque wrench further including at least one pin, the driving member includes an annular recess, and the at least one pin is disposed radially through the sleeve and engaged within the annular recess; the driving member is blocked by the at least one pin in the axial direction.

5. The insulated torque wrench of claim 1, wherein the driving member includes a first end portion and a second end portion in the axial direction, the first end portion is connected to the torque adjustment member, one of the second end portion and the first limitation member includes a polygonal hole, the other of the second end portion and the first limitation member includes a polygonal projection, and the polygonal projection is received in the polygonal hole in the axial direction.

6. The insulated torque wrench of claim 1, wherein the switching member includes at least one first blocking portion extending radially, the first limitation member includes a second blocking portion extending radially, and the first blocking portion and the second blocking portion are blocked with each other in the axial direction.

7. The insulated torque wrench of claim 6, wherein the first limitation member further includes at least one guiding block extending radially, the switching member further includes a sleeving hole and a surrounding wall, the driving member is inserted in the sleeving hole, the surrounding wall defines the sleeving hole, the surrounding wall includes at least one groove, the at least one groove extends in the axial direction and is in communication with the sleeving hole, and the at least one guiding block is received in the at least one groove and slidable in the axial direction.

8. The insulated torque wrench of claim 1, wherein the driving member includes a first lock portion, the switching member further includes a second lock portion, the first lock portion and the second lock portion are releasably locked with each other, and the second lock portion is blocked with the first lock portion in the axial direction.

9. The insulated torque wrench of claim 8, wherein the first lock portion is a bump, the first lock portion has a largest outer diametric dimension, the second lock portion includes a plurality of elastic arms, an engaging slot and an insertion opening, the plurality of elastic arms are swingable relative to one another, the plurality of elastic arms define the engaging slot and the insertion opening, the insertion opening is in communication with the engaging slot and has a caliber dimension, and the insertion opening allows the first lock portion to pass therethrough in the axial direction; the caliber dimension is smaller than the largest outer diametric dimension.

10. The insulated torque wrench of claim 1, further including at least one pin, wherein the driving member includes an annular recess, and the at least one pin is disposed radially through the sleeve and engaged within the annular recess; the driving member is blocked by the at least one pin in the axial direction.

* * * * *